(12) United States Patent
Lieu et al.

(10) Patent No.: US 6,952,601 B2
(45) Date of Patent: Oct. 4, 2005

(54) DISPLAY FOR A PORTABLE TERMINAL

(75) Inventors: Winston Hong Lieu, Holmdel, NJ (US); Howard X. Wu, Holmdel, NJ (US)

(73) Assignee: Mobicom Corporation, Holmdel, NJ (US)

( * ) Notice: Subject to any disclaimer, the term of this patent is extended or adjusted under 35 U.S.C. 154(b) by 383 days.

(21) Appl. No.: 10/207,643

(22) Filed: Jul. 29, 2002

(65) Prior Publication Data

US 2003/0157971 A1 Aug. 21, 2003

Related U.S. Application Data

(60) Provisional application No. 60/359,199, filed on Feb. 21, 2002, and provisional application No. 60/359,200, filed on Feb. 21, 2002.

(51) Int. Cl.[7] .................................................. H04B 1/38
(52) U.S. Cl. ..................... 455/575.1; 455/566; 455/90.3
(58) Field of Search .......................... 455/575.1, 575.3, 455/550.1, 566, 426, 90.3; 345/629; 235/462.45, 472.01

(56) References Cited

U.S. PATENT DOCUMENTS

| | | | |
|---|---|---|---|
| 6,149,062 A | * 11/2000 | Danielson et al. ..... | 235/472.01 |
| 6,580,932 B1 | 6/2003 | Finke-Anlauff | |
| 2001/0034229 A1 | * 10/2001 | Park et al. ................... | 455/426 |
| 2002/0125324 A1 | * 9/2002 | Yavid et al. ........... | 235/462.45 |
| 2002/0163530 A1 | * 11/2002 | Takakura et al. ........... | 345/629 |

\* cited by examiner

*Primary Examiner*—Sonny Trinh
*Assistant Examiner*—Phuoc Doan
(74) *Attorney, Agent, or Firm*—DeMont & Breyer, LLC

(57) ABSTRACT

A portable terminal having personal computing capability and wireless telecommunications capability. The portable terminal includes a display that is integral with, or otherwise attached to, a display. A housing is rotatably-coupled to the base and/or display. The portable terminal can be closed, wherein the housing overlies the base, or open, wherein base and housing flank the display. The display is fully visible to a user whether the portable terminal is open or closed. When open, a keyboard having keys that are apportioned between the housing and the base is accessible. To accommodate a change in the way in which a user is likely to hold and view the portable terminal when it's closed versus when it's open, the image in the display screen is rotated on command, or automatically, when the portable terminal is opened.

13 Claims, 9 Drawing Sheets

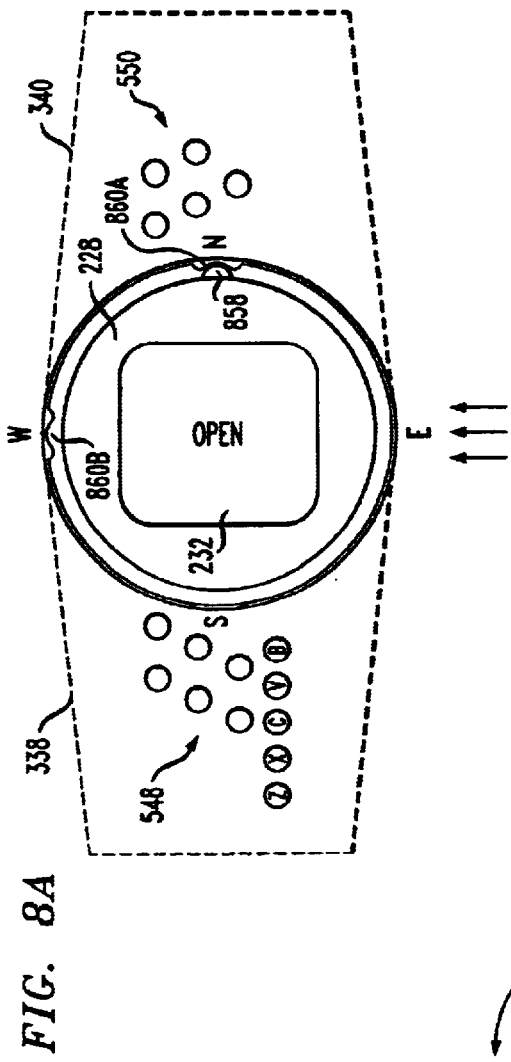
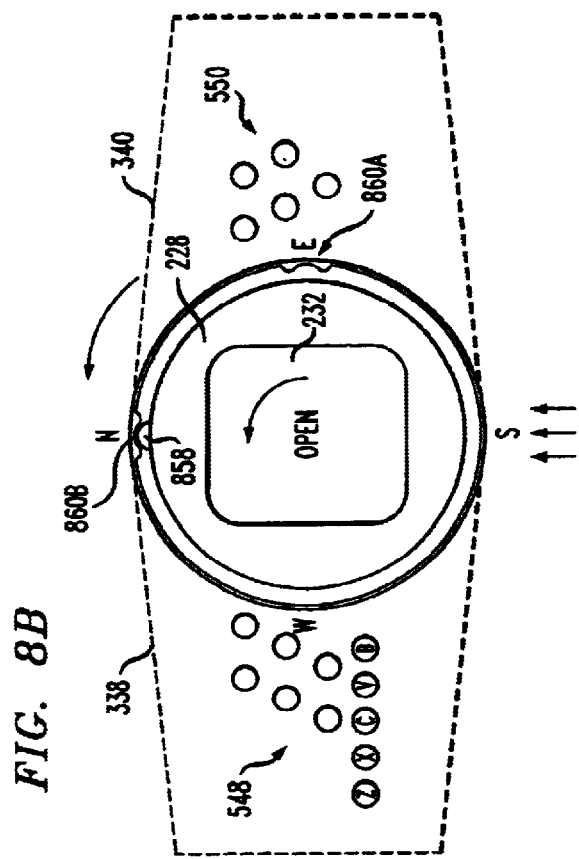
FIG. 8A
FIG. 8B

DISPLAY FOR A PORTABLE TERMINAL

STATEMENT OF RELATED CASES

This case claims priority of U.S. Provisional Patent Applications 60/359,199 and 60/359,200, both of which were filed on Feb. 21, 2000 and both of which are incorporated by reference herein.

FIELD OF THE INVENTION

The present invention relates to wireless telecommunications in general, and, more particularly, to a hand-held processor having wireless communications capabilities.

BACKGROUND OF THE INVENTION

Hand-held processors, which are commonly called Personal Digital Assistants ("PDAs"), are becoming increasingly popular. PDAs possess relatively limited information processing, storage and retrieval capabilities. With these limited capabilities, a PDA performs specific tasks, such as functioning as an electronic diary, phone book, personal database, memo taker, calculator, alarm clock, etc. A user inputs data directly into a PDA using a stylus or a reduced-size keyboard. Additionally, PDAs are generally capable of exchanging information with a desktop computer, either by a physical connection or an infrared transceiver. PDAs typically include a relatively large display (i.e., large relative to the overall size of the PDA) and several buttons or keys for accessing specific applications and for scrolling to view information. Some PDAs also include a reduced-size keyboard.

Lately, wireless telecommunications capabilities have been incorporated into PDAs. Doing so provides advanced functions such as transmitting, receiving and displaying text messages. It also relieves a user of having to transport both a PDA and a wireless terminal (e.g., cellular telephone, pager, etc.).

Currently, most of the combined PDA/wireless terminals have one or more shortcomings that relate, among other areas of deficit, to compromised ergonomics or "user-friendliness" relative to a dedicated PDA or a dedicated wireless terminal. For example, some combined PDA/wireless terminals have hinged keyboards that rotate from a closed position to an open position for use. In some of these devices, the telecommunications capabilities can be accessed whether the keyboard is in the open or the closed position. While this arrangement provides a convenience for the user, it causes problems related to the usability of the display and the keys.

SUMMARY OF THE INVENTION

The present invention is a combined PDA/wireless terminal (hereinafter a "portable terminal") that avoids some of the shortcomings of combined PDA/wireless terminals in the prior art.

A portable terminal in accordance with the illustrative embodiment of the present invention includes a base, a housing, and a display having a display screen. The housing is rotatably-coupled to the base and/or display. The portable terminal can be closed, wherein the housing overlies the base, or open, wherein the housing and the base flank the display. The portable terminal is opened by rotating the housing out-of-plane of the base. The display is fully visible to a user whether the portable terminal is open or closed.

The telecommunications capabilities of the portable terminal can be accessed when the portable terminal is closed and when it is open. Most of the PDA capabilities of the portable terminal are accessed when the portable terminal is open, wherein a keyboard having keys that are apportioned between the housing and the base is accessible.

When the portable terminal is open, it is typically held by a user in a different orientation than when it is closed. In particular, when closed, the portable terminal is held like a phone (i.e., in a "vertical" orientation) and, when open, it is typically held like an open book (i.e., in a "horizontal" orientation). The display screen is rotated relative to the user as between these two positions. Consequently, if text appears "right-side-up" when the portable terminal is closed, it will appear to a user to be on its side when the portable terminal is open.

In accordance with the illustrative embodiment of the present invention, the image in the display screen is rotated 90 degrees when the portable terminal is opened. This rotation re-orients the image so that it is "right-side-up" to a user (when he or she changes the orientation of the portable terminal). The image in the display screen can be electronically rotated, either automatically as the portable terminal is opened or by user command (a keystroke, etc.). In a variation of the illustrative embodiment, the display itself can be physically rotated.

In some variations of portable terminal, when the image in display screen is electronically rotated, the functionality of certain soft "convenience" keys that border the screen is also "shifted" or "rotated." The functionality is shifted so that a key appearing in a certain position relative to the display, from the user's perspective, always performs the same function.

BRIEF DESCRIPTION OF THE DRAWINGS

FIG. 8A depicts a portable terminal in accordance with the illustrative embodiment, wherein the portable terminal is open and wherein the display has not been physically rotated.

FIG. 8B depicts the portable terminal of FIG. 8A but after physical rotation of the display.

DETAILED DESCRIPTION

This Detailed Description begins with a relatively high-level description of the functionality of various circuitry/components (hereinafter collectively "components") that compose a portable terminal in accordance with the illustrative embodiment of the present invention. Following this, various physical implementations of some these components, and their mechanical and functional interrelationships with other parts of the portable terminal, are described.

Figure 1:
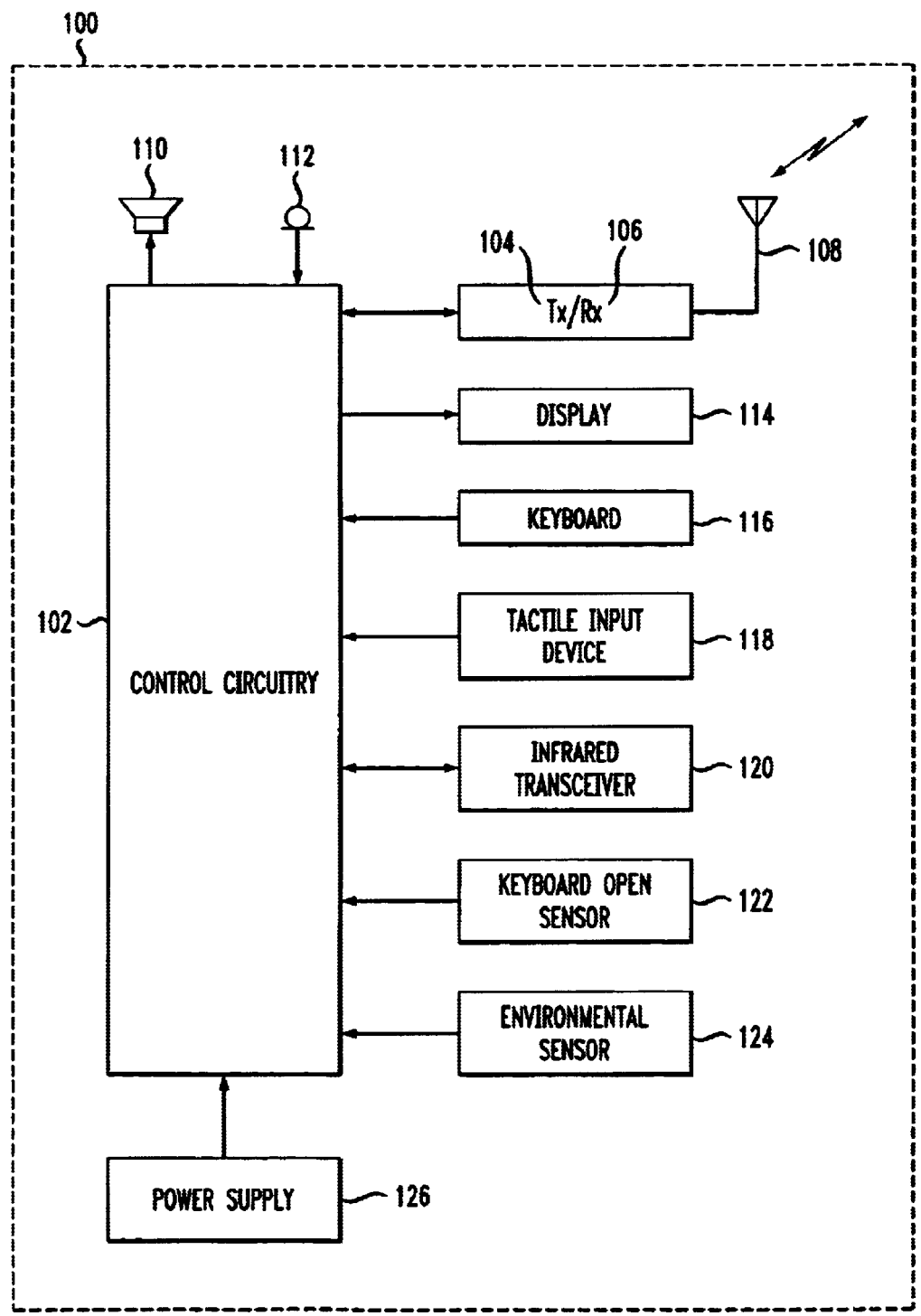
FIG. 1 depicts a block diagram of the salient components of a portable terminal in accordance with the illustrative embodiment of the present invention.

FIG. 1 is a high-level block diagram of portable terminal 100 in accordance with the illustrative embodiment of the present invention. Portable terminal 100 provides both wireless telecommunications capabilities and personal computing (i.e., PDA-type) capabilities.

With regard to its telecommunications capabilities, portable terminal 100 is capable of transmitting and receiving both voice and data with wireless base stations (not shown) or other wireless terminals, or both. Additionally, portable terminal 100 is capable of supporting telecommunications with wireline terminals through a wireless base station and wireline infrastructure. As to its personal computing capabilities, portable terminal 100 provides typical PDA computing and storage capabilities, including, without limitation, scheduling, address book storage and retrieval, note-taking, and an ability to run a variety of application software packages (e.g., calculators, games, etc.).

Portable terminal 100 advantageously includes: control circuitry 102, transmitter 104, receiver 106, antenna 108, speaker 110, microphone 112, display screen 114, keyboard 116, additional tactile input devices 118, infrared transceiver 120, keyboard-open sensor 122, environmental sensor(s) 124 and power supply 126.

Control circuitry 102 is advantageously capable of coordinating and controlling the other components of portable terminal 100 to provide, as appropriate, wireless telecommunications capability and personal computing capability, in known fashion. Control circuitry 102 typically includes a processor, memory, and electrical interconnections, among other hardware. In some variations of the illustrative embodiment, a single processor is used for carrying out and controlling PDA operations and wireless telecommunications operations. In some other variations, separate processors are used for PDA operations and wireless telecommunications operations.

It will be understood that as used herein, the term "processor" equivalently means a single integrated circuit ("IC"), or a plurality of ICs or other components that are connected, arranged or otherwise grouped together, such as microprocessors, digital signal processors, application-specific integrated circuits, associated memory (e.g., RAM, ROM, etc.) and other ICs and components. Control circuitry 102 can include programmed general-purpose hardware or special-purpose hardware, or both.

Transmitter 104 and receiver 106 provide wireless telecommunications capability to portable terminal 100 at radio frequencies. Embodiments of present invention can use any access technology (e.g., frequency-division multiple access, time-division multiple access, time-division duplex, code-division multiple access, etc.) and any modulation scheme (e.g., frequency shift keying, quadrature phase-shift keying, etc.) in accordance with any interface (e.g., IS-41, IS-54, IS-95, GSM, etc.). Furthermore, portable terminal 100 can transmit and receive at any frequency (e.g., 800 MHz, 1800 MHz, etc.). It will be clear to those skilled in the art how to make and use transmitter 104, receiver 106 and antenna 108.

Speaker 110 is capable of outputting an acoustic signal (e.g., the speech of another person, an alerting or ringing signal, etc.) to a user of portable terminal 100 in well-known fashion. Furthermore, control circuitry 102 is capable of adjusting the volume of the acoustic signal output from speaker 110.

Microphone 112 is capable of receiving an acoustic signal (e.g., the speech of the user of portable terminal 100, etc.), converting it to an electrical signal containing information that is indicative of the acoustic signal, and of conveying that information to control circuitry 102 for transmission via transmitter 104 in known fashion.

Display 114 is a visual display for outputting information (e.g., text, images, video, etc.) to a user of portable terminal 100. Display 114 includes a display screen, such as a liquid crystal display ("LCD"), and various electronics that, in conjunction with control circuitry 102, drives the display screen. Display 114 also typically includes a light source (not depicted) for illuminating the display screen. It will be clear to those skilled in the art how to make and use display screen 114.

Keyboard 116 is a tactile input device that includes a set of keys that enables portable terminal 100 to receive information from a user. The keys in keyboard 116 can be used to input a variety of different types of information to portable terminal 100. For example, the keys of keyboard 116 can be representative of, without limitation, alphabetic characters of an alphabet, numerals, mathematical operators, mathematical functions, specific commands that are useful in conjunction with certain types of application software (e.g., games, etc.), retail items (e.g., food and drink that is offered by a restaurant, specific types of inventory in a warehouse, etc.).

Keyboard 116 can include one or more keypads (i.e., regional groupings or grids of numerical and/or function keys arranged for efficient use). Advantageously, keyboard 116 is illuminated by a light source, under the control of control circuitry 102, to aid the user of portable terminal 100 to enter information into keypad 116. It will be clear to those skilled in the art how to make and use keyboard 116.

Additional tactile input devices 118 include keys or key-like elements (e.g., a joystick, etc.) that are not physically co-located with the group of keys that define keyboard 116. These additional keys enable user to deliver information to portable terminal 100. In some embodiments, the information provided by additional tactile input devices 118 is different than the information that can be provided via the keys in keyboard 116. For example, one additional tactile input device 118 is a pointing device that moves a cursor in display screen 114. A second additional tactile input device 118 is a scroll button that allows a user to scroll through menu selections that are presented in display screen 114. It will be clear to those skilled in the art how to make and use additional tactile input devices 118.

Infrared transceiver 120 is a device (e.g., an IrDA compliant device, etc.) that enables portable terminal 100 to communicate with other devices by modulating infrared light. It will be clear to those skilled in the art how to make and use infrared transceiver 120.

Keyboard-open sensor 122 is a device that senses when keyboard 116, which in some variations of the illustrative embodiment is rotatable between an open position and a closed position, is in the open position (and/or is being opened). A signal from the keyboard-open sensor is delivered to control circuitry 102, which, as appropriate, can take certain actions, as described later in this specification. Keyboard-open sensor 122 can be implemented in any of variety ways known to those skilled in the art (e.g., as a mechanical sensor, as an optical sensor, etc.).

Environmental sensor(s) 124 are one or more devices that sense ambient environmental factors (e.g., temperature, vibration, noise, light, motion, etc.). Environmental sensor (s) 124 generate a signal that is responsive to the environmental factor, and the generated signal is received by control circuitry 102. The control circuitry then alters certain aspects of various components (e.g., the level of illumination that is provided to display screen 114 and/or keyboard 116, the volume of speaker 110, etc.).

It will be appreciated that the specific implementation of environmental sensor(s) 124 is a function of the environmental factor that is being sensed. For example, when environmental sensor 124 is required to sense ambient noise, environmental sensor 124 can be, for example, a microphone, such as microphone 112. When environmental sensor 124 is required to sense ambient light intensity, it can be, for example, a cadmium-sulfide photoresistor, a charge-coupled device, or other known light-sensitive device. It will be clear to those skilled in the art how to make and use environmental sensors 124.

Power supply 126 supplies electrical power to the components of portable terminal 100 that require power (e.g., processor(s), display screen 114, sensors 122 and/or 124, etc.). Power supply 126 is advantageously implemented with rechargeable or replaceable batteries. In some embodiments, at least two separate power supplies 126 are provided. One of the supplies, which is the primary power supply, has greater energy output and storage capacity and is used for powering portable terminal 100 during normal operations. The second supply is a back-up that is used, for example, to maintain data (e.g., address book information, scheduling information, etc.) in memory when the primary power supply is removed (e.g. for replacement, etc.).

Various physical implementations of the components that are described (functionally) above, and their mechanical and functional interrelationships with other parts of the portable terminal, are described in applicant's co-pending patent application Ser. No. 10/161,831 "Portable Terminal With Foldable Keyboard"), which is incorporated herein by reference. Many of the components that are described therein, and which are properly included in at least some versions of the illustrative embodiment of the present invention, are not described herein. The purpose for these omissions is to maintain a focus on elements that are germane to an understanding of the present invention. Also, for the sake of clarity, the components that have been described in terms of their functionality (see FIG. 1), are provided with a "call-out" (i.e., numerical identifier) that is in the range 102 through 198. The illustrative physical implementations these components, some of which appear in FIGS. 2 through 6D, have been provided with a different call-out. The purpose for this is that, in some cases, a component, as functionally described, incorporates more elements (additionally circuitry, etc.) than is depicted in the illustrative physical implementations.

With reference to FIGS. 2 through 5D, portable terminal 100 includes display 228 and keyboard-housing 230. Display 228 has a display screen 232 and one or more convenience keys 236 that are advantageously "soft" (i.e., re-definable) keys. Keyboard-housing 230 consists of base 338 and housing 340 (see, FIGS. 3 through 5D). Housing 340 is rotatably connected to base 338 and/or display 228 at pivot 442. By virtue of pivot 442, housing 340 is capable of rotating "out-of-plane" (of base 338) about pivot axis 1—1. Pivot axis 1—1 bisects display 228. In the illustrative embodiment, pivot 442 is implemented as rod 444, and cooperating receiver 446 that depends from housing 340.

Figure 2:
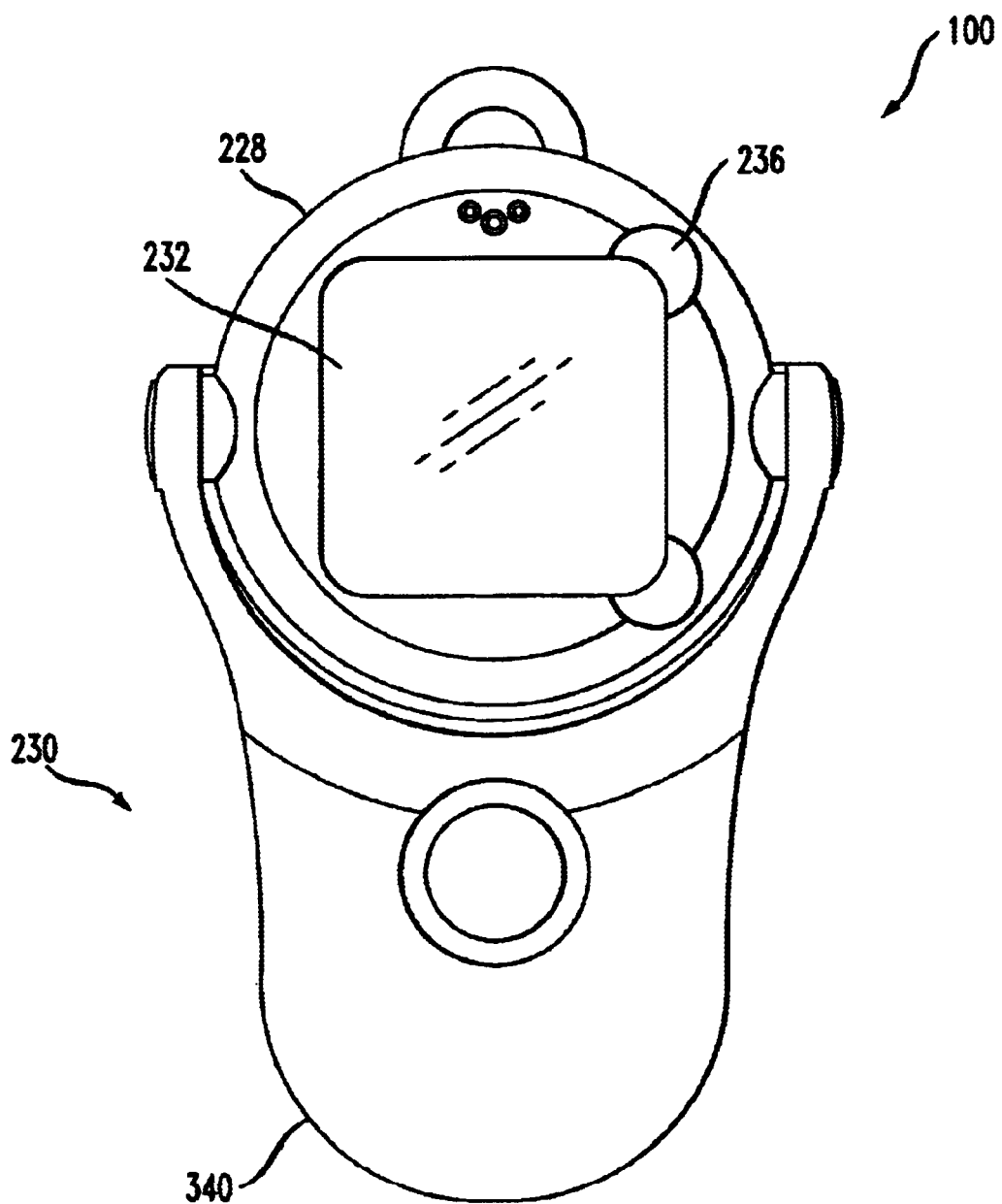
FIG. 2 depicts a plan view of a portable terminal in accordance with the illustrative embodiment of the present invention.
Figure 3:
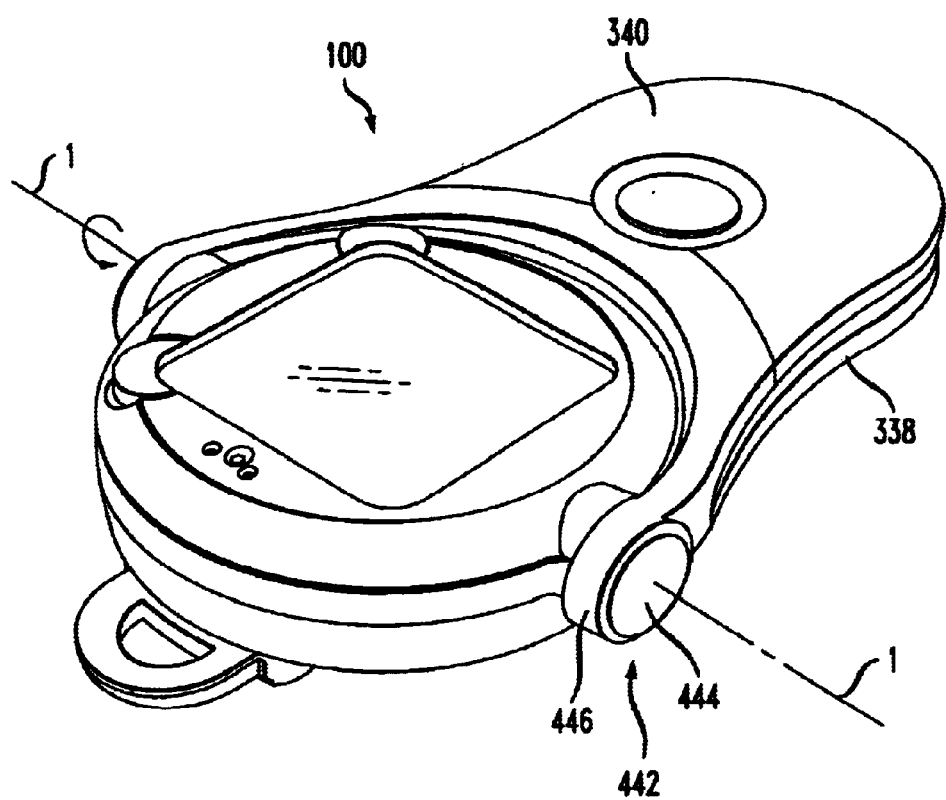
FIG. 3 depicts a perspective view of the portable terminal shown in FIG. 2.
Figure 4:
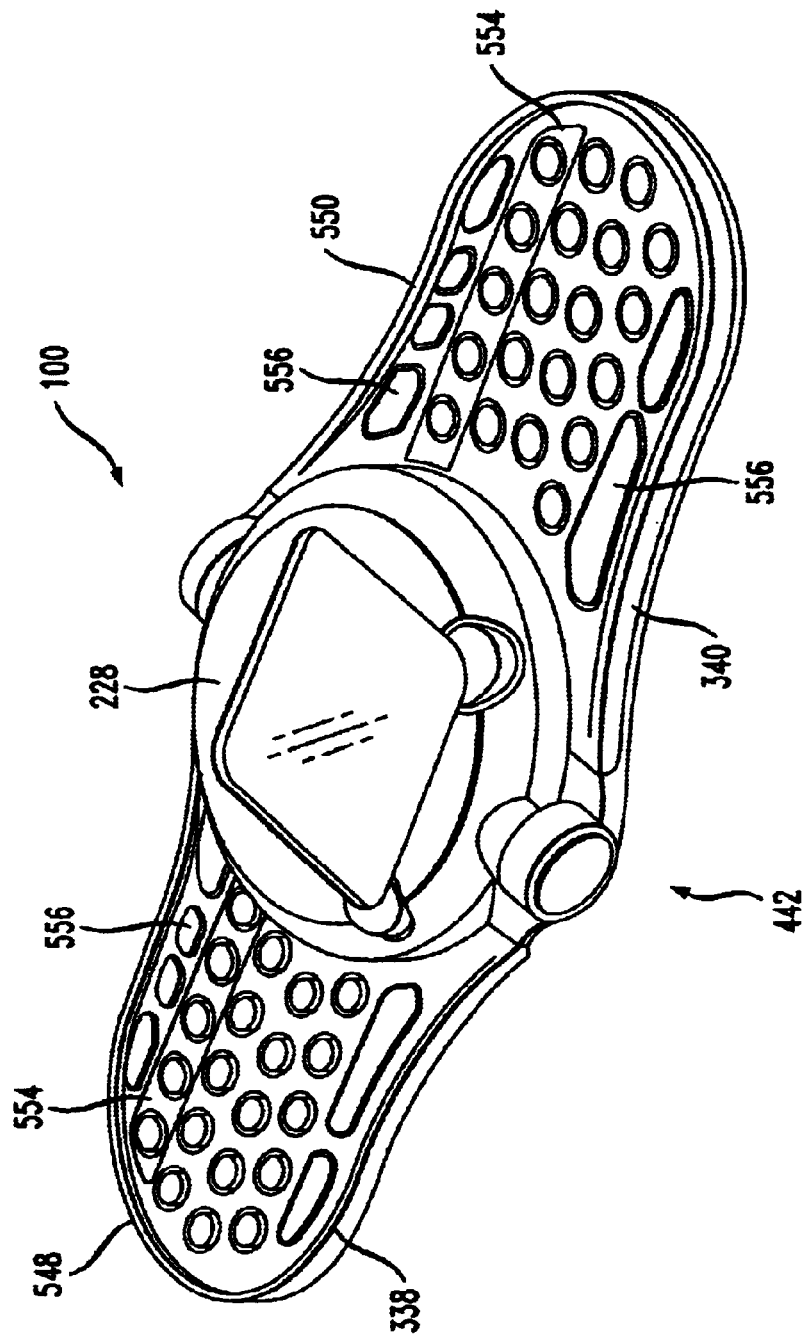
FIG. 4 depicts the portable terminal of FIGS. 2 and 3 in an open position wherein its keyboard is accessible.
Figure 5A:
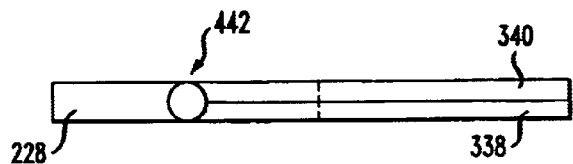
FIGS. 5A–5D depicts the housing of a portable terminal in accordance with the illustrative embodiment being rotated from a fully closed position to a fully open position.
Figure 5B:
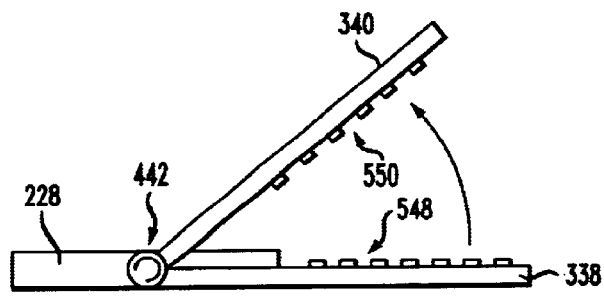
Figure 5C:
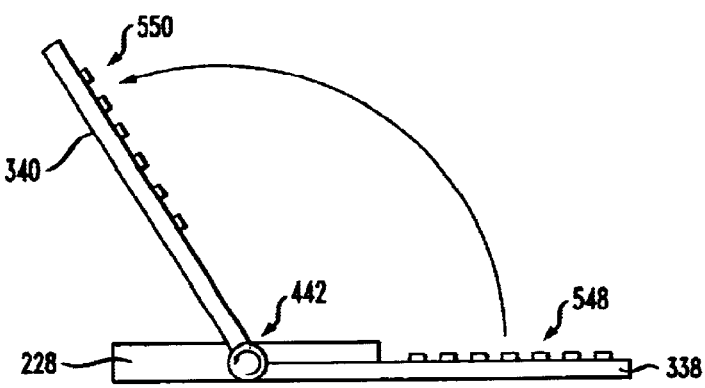
Figure 5D:
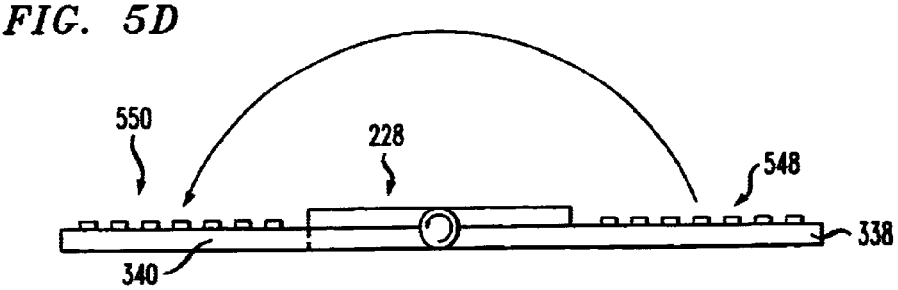

In accordance with the illustrative embodiment of the present invention, portable terminal 100 can be used in either of two basic configurations: "closed," as depicted in FIGS. 2, 3, and 5A or "open," as depicted in FIGS. 4 and 5D.

When portable terminal 100 is closed, housing 340 is superposed over base 338 so that the two housings coincide and serve as a handle for gripping the portable terminal 100 in the manner of a conventional wireless phone. Additionally, in this state, base 338 and housing 340 serve as a cover for a keyboard. As described further below, the keyboard is partitioned into two portions, one disposed on the inner surface of the base and the other on the inner surface of the housing. When closed, portable terminal 100 can be used to make and receive telephone calls.

To use various PDA-type applications (e.g., address book, schedule, etc.) of portable terminal 100 or to enter alpha-numeric data (e.g., to send a data message, etc.), the keyboard of portable terminal 100 is accessed. To do so, portable terminal 100 is opened by rotating housing 340 out-of-plane away from base 338, as illustrated in FIGS. 5B and 5C.

In the illustrative embodiment, the keyboard is implemented in two portions, keyboard portion 548 and keyboard portion 550. Keyboard portion 548 is disposed within base 338 and keyboard portion 550 is disposed within housing 340. When portable terminal 100 is open, display 228 is disposed between keyboard portion 548 and keyboard portion 550.

In the illustrative embodiment, housing 340 is rotated 180 degrees out-of-plane to a "fully-open" position. It will be understood, however, that housing 340 need not be rotated a full 180 degrees to access and use the keyboard. In fact, a user might prefer to rotate housing 340 somewhat less than 180 degrees (e.g., 160 degrees rotation, etc.). In particular, some users might find that when base 338 and housing 340 are less than 180 degrees apart, less stress is placed on their wrists, especially during periods of extended use (e.g., game playing, etc.). Alternatively, in some variations of portable terminal 100, housing 340 is rotatable beyond 180 degrees, again for the comfort of the user.

Figure 6A:
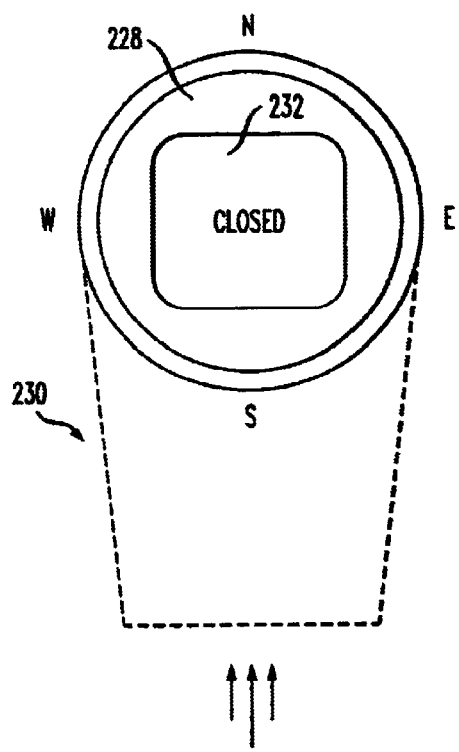
FIG. 6A depicts a portable terminal when closed, with particular attention to a user's perspective relative to an image in the display screen.

As suggested above, when portable terminal 100 is closed, it is most likely to be used in the manner of a conventional wireless terminal to send and receive calls. FIG. 6A depicts portable terminal 100 (keyboard housing 230 shown in phantom) closed. From the perspective of a user that is holding "closed" portable terminal 100 in front of himself or herself, N(orth) is "up," S(outh) is "down," E(ast) is "right," and W(est) is "left," (this is the same view that is presented to the reader, as he or she gazes at FIG. 6A). So, to the user, the word "CLOSED," which appears in display screen 232, is properly oriented for reading.

Figure 6B:
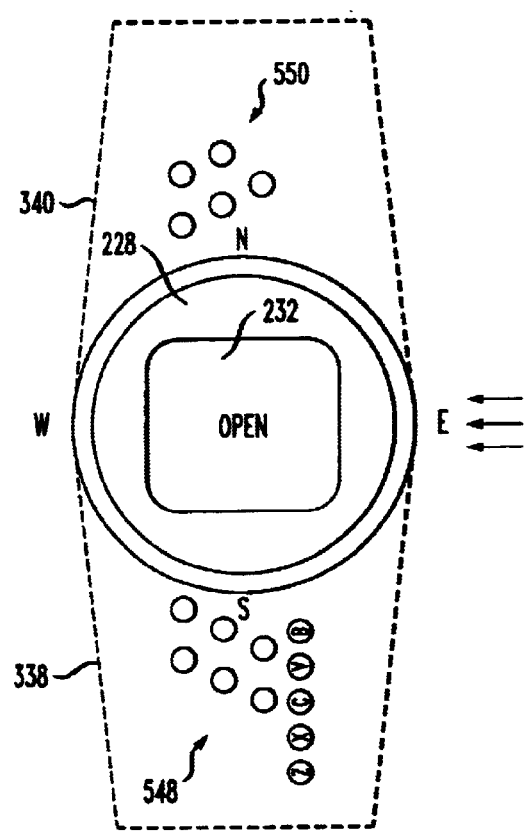
FIG. 6B depicts a portable terminal when open, with particular attention to a user's perspective relative to an image in the display screen.

As previously indicated, when it is open, portable terminal 100 is most likely being used as a PDA. FIG. 6B depicts portable terminal 100 (base 338 and housing 340 shown in phantom). From the perspective of a user that is holding "open" portable terminal 100 in front of himself or herself, N(orth) is "right," S(outh) is "left," E(ast) is "down," and W(est) is "up." This is the view that is presented to the reader when he or she rotates FIG. 6B clockwise by 90 degrees. So, to the user, the word "OPEN," which appears in display screen 232, is not properly oriented for reading. (A user could use portable terminal 100 in the manner of a "flip-phone" [i.e., in a vertical orientation] when it is open, so that the word "OPEN" would be properly oriented for reading. But this would make it very difficult to use the keyboard, in particular the alpha-character keys.)

Consequently, in accordance with the illustrative embodiment of the present invention, the image in display screen 232 is rotated counterclockwise 90 degrees. For a user that is holding portable terminal 100 in a "horizontal" orientation (i.e., housing 340 to the right of display 228 and base 338 to the left of display 228), this re-orients the image so that it is in a "normal" reading orientation. This horizontal orientation is assumed to be the user's orientation for the description of FIGS. 7A, 7B and 8A and 8B, below. Consequently, these Figures should be viewed as indicated by the arrows that appear in those Figures.

Figure 7A:
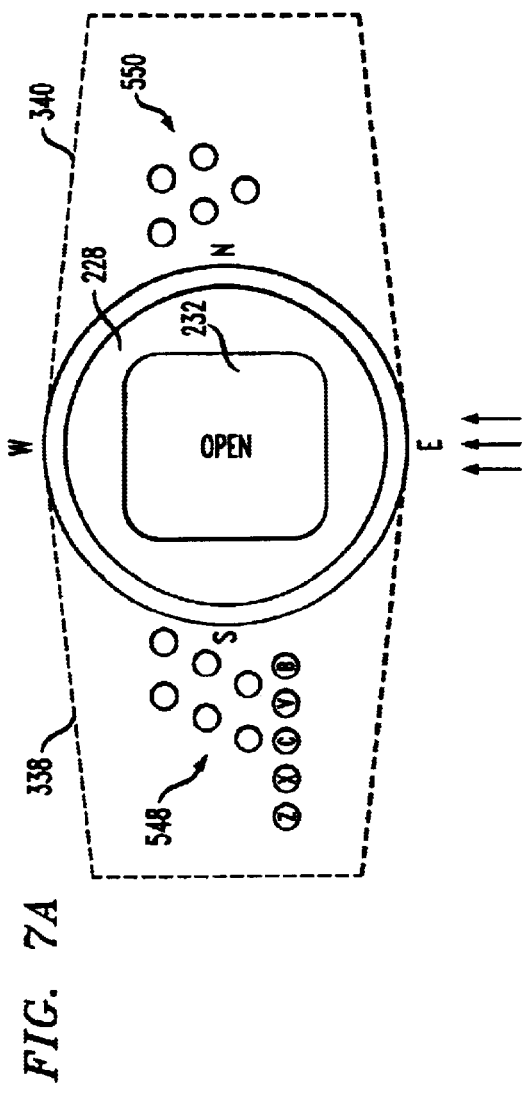
FIG. 7A depicts a portable terminal in accordance with the illustrative embodiment, wherein the portable terminal is open and the image in the display screen has not been electronically rotated.

Rotation can be accomplished in at least two ways. One way is to electronically rotate the image. Electronic rotation is described with reference to FIGS. 7A, 7B and 10. FIG. 7A depicts open portable terminal 100 before the image in display screen 232 is electronically rotated. In FIG. 7A, screen image N(orth) is "right," and screen image W(est) is "up," etc. To a user, the word "OPEN," which appears in display screen 232, is not properly oriented.

Figure 7B:
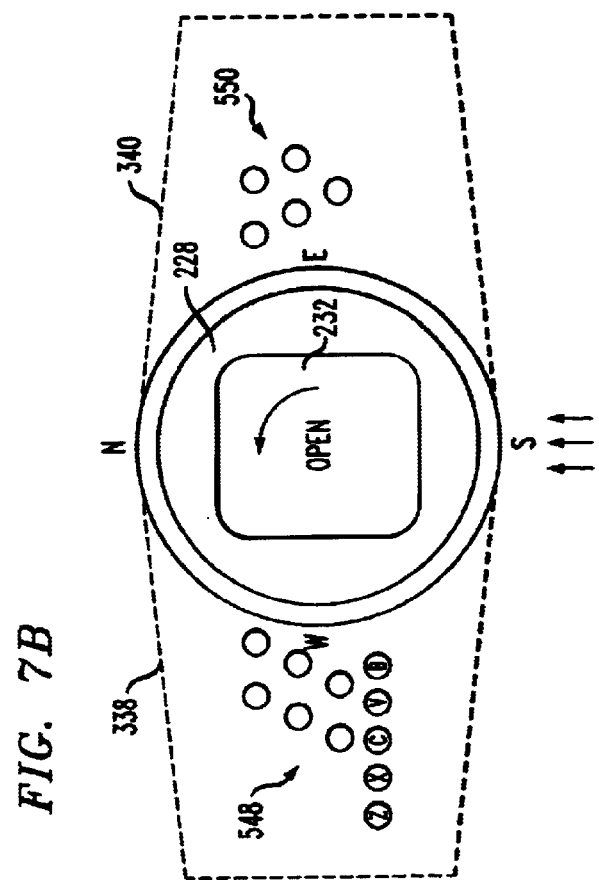
FIG. 7B depicts the portable terminal of FIG. 7A but after electronic rotation of the image in the display screen.

FIG. 7B depicts open portable terminal 100 after the image in display screen 232 is electronically rotated. In FIG. 7B, screen image N(orth) is "up," screen image W(est) is "left," etc. To a user, the word "OPEN," which appears in display screen 232, is now properly oriented.

Portable terminal 100 is advantageously capable of automatically (i.e., in the absence of an explicit command from the user) electronically rotating the image in display screen 232 and also capable of electronically rotating the image on command from the user. In accordance with the illustrative embodiment of the invention, automatic rotation is triggered as a user rotates housing 340 away from base 338 to open portable terminal 100. More particularly, when keyboard open sensor 122 senses that the portable terminal 100 is being opened, it sends a signal to control circuitry 102. When the signal is received by control circuitry 102, image-rotating processing rotates the image in display screen 232. It is within the capabilities of those skilled in the art to electronically rotate an image, so implementation details are not described here.

Alternatively, a user can cause an image in display screen 232 to electronically rotate by explicit command. That is, the user can rotate the image by depressing a key. This key can be, without limitation, a key in keyboard portion 548 or keyboard portion 550 or one of convenience keys 236.

Figure 10:
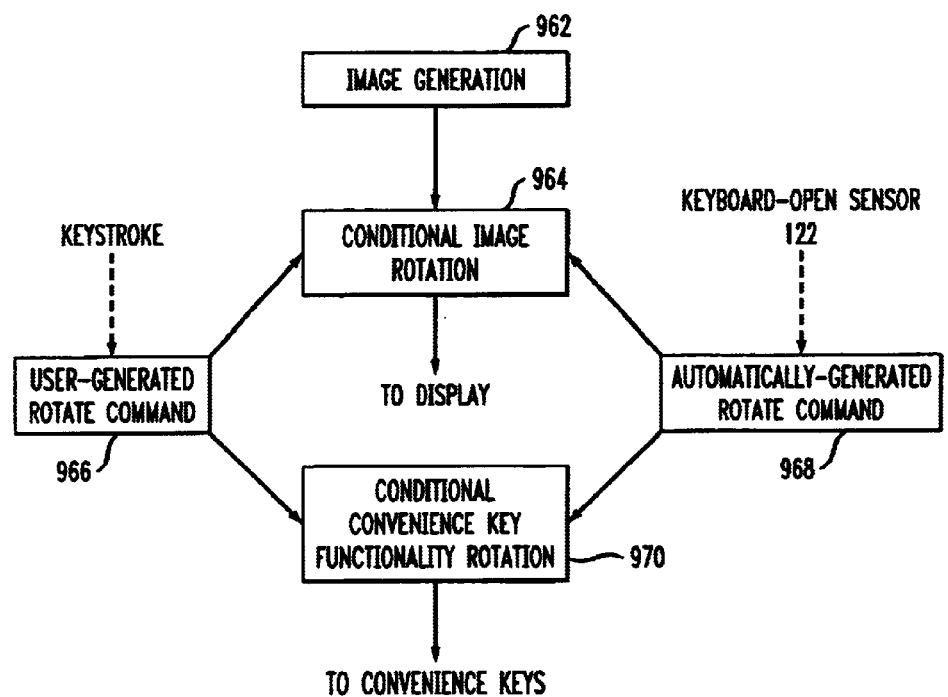
FIG. 10 depicts a block diagram showing electronic rotation of an image in the display screen and rotation of the functionality of convenience keys of a portable terminal in accordance with the illustrative embodiment of the present invention.

FIG. 10 depicts a high-level block diagram that illustrates, among other functions, electronic image rotation, as described above and performed by control circuitry 102. As depicted in FIG. 10, an image is generated in operation 962. In operation 964, the image is rotated (e.g., counterclockwise by 90 degrees, etc.) if user-generated rotate command 966 is issued (e.g., a user depressing a key, etc.) or if automatic rotate command 968 is issued (e.g., from keyboard open sensor 122, etc.). To rotate the image 90 degrees counterclockwise, the image is transformed as follows:

$$(x,y) \rightarrow (-y,x) \quad [1]$$

where: x and y are the coordinates in a two-dimensional Cartesian coordinate system.

Operations 962, 964, 966, and 968 can be performed by hardware, software, or a combination of both. When portable terminal 100 is closed (after having been open) such that keyboard-open sensor 122 no longer senses an "open" condition, image rotation ceases. Alternatively, a keystroke by a user can cause the image rotation to stop.

A second way to rotate the image is to physically rotate display 228 (or display screen 232). Physical rotation is illustrated with reference to FIGS. 8A and 8B. FIG. 8A depicts open portable terminal 100 before display 228 is rotated (e.g., by hand, etc.). In FIG. 8A, screen image N(orth) is "right," and screen image W(est) is "up," etc. To a user, the word "OPEN," which appears in display screen 232, is not properly oriented.

It will be appreciated that portable terminal 100 must be specifically configured or adapted to enable display 228 to rotate independently of housing 340 and base 338. Representative of such an adaptation is an arrangement consisting of ball 858 and two hemispherical detents 860A and 860B. When ball 858 engages detent 860A, display 228 locks in place with the orientation depicted in FIG. 8A. With turning force, ball 858 disengages from detent 860A and display 228 is free to rotate. With continued rotation, ball 858 engages detent 860B, such that display 228 is locked in place with the orientation depicted in FIG. 8B. In FIG. 8B, screen image N(orth) is "up," screen image W(est) is "left," etc. To a user holding portable terminal 100 in a horizontal position (as described above), the word "OPEN," which appears in display screen 232, is now properly oriented. A variety of other arrangements, as are well known to those skilled in the art, that enable display 228 to rotate independently of housing 340 and base 338 can suitably be used in other variations of the illustrative embodiment.

In some variations of portable terminal 100, display 228 includes four convenience keys 236. For example, in FIGS. 9A and 9B, which show display 228 without housing 340 and base 338, display 228 includes convenience keys 236-1, 236-2, 236-3, and 236-4 bordering the corners of display screen 232. In variations of the portable terminal 100 in which the image in display screen 232 (but not display 228) is rotated (i.e., electronic image rotation), the spatial orientation of convenience keys 236-1, 236-2, 236-3, and 236-4 changes, relative to the image, upon such rotation. This scenario is illustrated by FIGS. 9A and 9B.

Figure 9A:
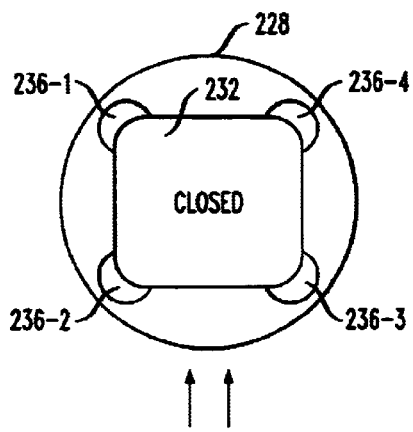
FIG. 9A depicts a portable terminal having four convenience keys that border the corners of the display screen in accordance with the illustrative embodiment.
Figure 9B:
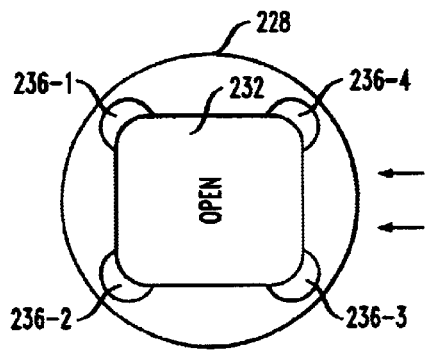
FIG. 9B depicts the portable terminal of FIG. 9A after an image in the display has been electronically rotated and a user has changed his or her viewing perspective.

In FIG. 9A, portable terminal 100 is closed, and a user views display screen 232 as indicated by the arrows. Consequently, the user sees convenience key 236-1 bordering the upper left of display screen 232 and convenience key 236-2 bordering the lower left of display screen 232, etc. Assume that the user opens portable terminal 100. And, in conjunction with this, assume that the image in display 232 is electronically rotated as described above and the user repositions portable terminal 100 such that it is being held in a horizontal position and viewed as shown by the arrows in FIG. 9B.

From the user's perspective, convenience key 236-1 no longer borders the upper left of display screen 232 and convenience key 236-2 no longer borders the lower left of display screen 232. As can be seen from FIG. 9B, the user sees convenience key 236-1 bordering the upper right of display 232 and convenience key 236-2 bordering the upper left of display screen 232.

If the various convenience keys perform different functions, this change in spatial orientation might be problematic for a user. In particular, with continued use, a user will tend to associate the function of a first convenience key with its position relative to the screen (e.g., the key to the lower-left of the screen accesses a telephone directory, etc.). But when the image is electronically rotated, and the user changes his or her perspective relative to portable terminal 100, a second convenience key is, from the user's perspective, now in the position that was occupied by the first convenience key. Consequently, to the extent that a user associates the function of a key with its position relative to display screen 232, he or she must recognize that the function will change depending upon whether portable terminal 100 is open or closed. This is undesirable.

In accordance with some variations of portable terminal 100, when the image in display screen 232 is electronically rotated, the functionality of convenience keys 236 is "shifted" or "rotated" accordingly so that a key appearing in a certain position relative to the display, from the user's perspective, always performs the same function. So, for example, the convenience key that appears, from a user's perspective, at the lower left of the display always accesses the telephone directory, etc. For the scenario illustrated in FIGS. 9A and 9B, the functionality of each convenience key should be "shifted" to the convenience key that next appears with counterclockwise rotation. That is, the functionality of convenience key 236-1 is shifted to convenience key 236-2, the functionality of convenience key 236-2 is shifted to convenience key 236-3, etc. To this end, convenience keys 236 are advantageously software re-definable (i.e., soft) keys.

It will be understood that the terms "shifted" or "rotated," as used to describe the change in function of convenience keys 236, is intended to be descriptive of the end result rather than the process itself. That is; the functionality of one key is not actually shifted to another; rather, the operation of the keys are simply redefined or reprogrammed by the circuitry/software of portable terminal 100 in known fashion. This is the sense in which the terms "shifted" or "rotated" are used in this description and the appended claims with regard to convenience keys 236.

FIG. 10 depicts a high-level block diagram of method 900 for operating portable terminal 100. The method pertains to rotation of an image and shifting of convenience-key functionality, as described above and performed by control circuitry 102.

As depicted in FIG. 10, in operation 970, the functionality of convenience keys 962 is rotated (e.g., counterclockwise by 90 degrees, etc.) if user-generated rotate command 966 is issued (e.g., a user depressing a key, etc.) or if automatic rotate command 968 is issued (e.g., from keyboard open sensor 122, etc.). Operations 966, 968, and 970 can be performed by hardware, software, or a combination of both. When portable terminal 100 is closed (after having been open) such that keyboard-open sensor 122 no longer senses an "open" condition, rotation of image or shifting of convenience-key functionality ceases. Alternatively, a keystroke by a user can cause the rotation and shifting to stop.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

We claim:
1. A portable terminal comprising:
   (1) a base, wherein said base has a first group of keys that define a first portion of a keyboard;
   (2) a display coupled to the base, wherein said display has a display screen;
   (3) a housing, wherein:
      (a) said housing has a second group of keys that define a second portion of a keyboard;
      (b) said housing is rotatably coupled to at least one of said display or said base;
      (c) said housing is rotatable out-of-plane between a first position and a second position, wherein:
         (i) in said first position, said housing overlies said base;
         (ii) in said second position, said housing and said base flank said display; and
         (iii) in said said position, said first portion of said keyboard and said second portion of said keyboard flank said display; and
   (4) an image rotation device, wherein said image rotation device rotates an image in said display screen, wherein said image is rotated upon occurrence of at least one condition selected from the group consisting of:
      (a) said housing being rotated from said first position toward said second position,
      (b) said housing being rotated from said second position toward said first position; and
      (c) a command from a user
   (5) a first software-definable convenience key, wherein said first convenience key borders said display screen and wherein said first convenience key performs a first function; and
   (6) a second software-definable convenience key, wherein said second convenience key borders said display screen and wherein said convenience key performs a second function.

2. The portable terminal of claim 1 wherein said image rotation device comprises control circuitry and software.

3. The portable terminal of claim 2 wherein said image rotation device further comprises a keyboard-open sensor that senses when said housing is rotated out-of-plane away from said first position.

4. The portable terminal of claim 2 wherein said image rotation device further comprises a key for inputting a command into said control circuit.

5. The portable terminal of claim 1 further comprising means for shifting said first function to said second convenience key.

6. The portable terminal of claim 1 wherein said portable terminal is physically adapted to provide wireless-telecommunications capability and personal-computing capability.

7. A portable terminal comprising:
   (A) a base, wherein said base has a first group of keys that define a first portion of a keyboard;
   (B) a display coupled to the base, wherein said display has a display screen;
   (C) a first software-definable convenience key, wherein said first convenience key borders said display screen and wherein said first convenience key performs a first function; and
   (D) a second software-definable convenience key, wherein said second convenience key borders said display screen and wherein said second convenience key performs a second function;

(E) a housing, wherein said housing has a second group of keys that define a second portion of a keyboard, and wherein said housing is coupled, to at least one of said display or said base, for out-of-plane rotation relative to said base;

(F) a keyboard-open sensor, wherein said keyboard-open sensor senses when said housing is rotated away from said base and generates a signal indicative thereof; and (G) circuitry for:
  (i) rotating an image in said display screen; and
  (ii) shifting said first function to said second convenience key, wherein said circuitry rotates said image and shifts said first function when it receives said signal.

8. The portable terminal of claim 7 further comprising a key that, when depressed, generates a signal that directs said circuitry to rotate said image in said display screen.

9. The portable terminal of claim 7 further comprising circuitry and components that enable said portable terminal to operate as a wireless terminal and as a personal digital assistant.

10. In a portable terminal having a display screen, a housing, a base, a first software-definable convenience key and a second software-definable key, wherein said first convenience key and said second convenience key borders said display screen, and wherein said portable terminal is closed when said housing overlies said base, and said portable terminal is open when said housing is rotated out-of-plane of said base, a method comprising:

generating an image for said display screen, said image to be displayed in a reference orientation;

generating a signal when said portable terminal is open; and rotating said image, relative to said reference orientation, when said signal is received; and shifting a first function of said first convenience key to said second convenience key when said signal is received.

11. The method of claim 10 wherein said operation of rotating further comprises rotating said image, as it appears in said display screen, by 90 degrees relative to said reference orientation.

12. The method of claim 10 wherein said operation of generating a signal further comprises automatically sensing when said portable terminal is open.

13. The method of claim 10 wherein said operation of generating a signal further comprises depressing a key when said portable terminal is open.

* * * * *